Figure 1:
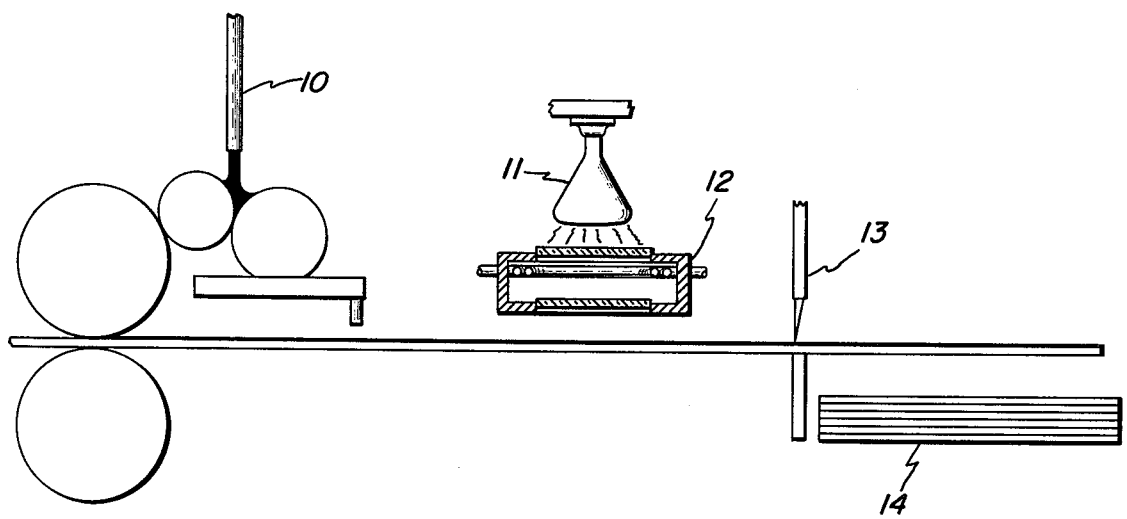

United States Patent [19]

Moore et al.

[11] 4,107,391

[45] Aug. 15, 1978

[54] METHOD FOR MAKING THERMOFORMABLE COMPOSITES AND COMPOSITES MADE THEREBY

[75] Inventors: James E. Moore, Clifton Park; Siegfried H. Schroeter, Schenectady, both of N.Y.

[73] Assignee: General Electric Company, Schenectady, N.Y.

[21] Appl. No.: 778,612

[22] Filed: Mar. 17, 1977

Related U.S. Application Data

[63] Continuation-in-part of Ser. No. 423,007, Dec. 10, 1973, abandoned, which is a continuation-in-part of Ser. No. 320,302, Jan. 2, 1973, abandoned.

[51] Int. Cl.² ............................................. B05D 3/06
[52] U.S. Cl. ........................... 428/483; 204/159.15; 427/53; 427/54; 428/412; 428/500
[58] Field of Search ............................ 427/44, 53, 54; 204/159.15, 159.16; 428/412, 483, 482, 520; 53/22 R, 22 A, 25

[56] References Cited

U.S. PATENT DOCUMENTS

| | | | |
|---|---|---|---|
| 3,552,986 | 1/1971 | Bassemir | 427/54 |
| 3,558,387 | 1/1971 | Bassemir | 427/54 |
| 3,616,367 | 10/1971 | Zunker | 427/54 |
| 3,650,669 | 3/1972 | Osborn et al. | 427/54 |
| 3,655,823 | 4/1972 | Parker et al. | 427/54 |
| 3,699,022 | 10/1972 | Behrens et al. | 427/54 |
| 3,714,007 | 1/1973 | Borrel et al. | 427/54 |
| 3,721,723 | 3/1973 | Heidel | 427/54 |
| 3,759,807 | 9/1973 | Osborn et al. | 427/54 |
| 3,770,490 | 11/1973 | Parker | 427/54 |

*Primary Examiner*—John H. Newsome
*Attorney, Agent, or Firm*—William A. Teoli; Joseph T. Cohen; Charles T. Watts

[57] ABSTRACT

A method is provided for making a thermoformable composite involving the treatment of at least one of the major surfaces of a thermoplastic substrate, such as a sheet, with a solventless ultra-violet (UV) curable organic resin, followed by the UV-curing of the resin. The cured resin provides an adherent decorative and/or protective coating having desirable biaxial elongation characteristics.

12 Claims, 2 Drawing Figures

METHOD FOR MAKING THERMOFORMABLE COMPOSITES AND COMPOSITES MADE THEREBY

This application is a continuation-in-part of our co-pending application Ser. No. 423,007, filed Dec. 10, 1973, which is a continuation-in-part of application Ser. No. 320,302, filed Jan. 2, 1973, both now abandoned, and assigned to the same assignee as the present invention.

The present invention relates to a method for making a thermoformable composite involving the treatment of a thermoplastic substrate with a UV-curable resin followed by subjecting the UV-curable resin to ultraviolet radiation to effect the cure of the resin.

A common method employed to improve the surface characteristics of thermoplastic structures, such as polystyrene sheet, polycarbonate sheet, etc., involves the bonding of a thermoplastic film to the surface of the thermoplastic sheet, such as shown by Osteen U.S. Pat. No. 3,661,685, assigned to the same assignee as the present invention, Moore U.S. Pat. No. 3,681,167, etc. The thermoplastic film can serve protective or decorative functions. A specific method of making such thermoplastic composites involves lamination of a preformed thermoplastic film to extruded thermoplastic sheets. The resulting film-sheet laminates then can be passed through a heated nip roll to effect the bonding of the film to the thermoplastic sheet.

Although the above technique provides a thermoplastic laminate which is convertible to various shapes by thermoforming and vacuum forming and has characteristics superior to the original thermoplastic structure, the lamination technique has serious disadvantages. For example, as shown by U.S. Pat. No. 3,654,069, Fruedenberg, an adhesive often must be employed to bond the film to the supporting thermoplastic sheet. In addition, the cost of the apparatus required for extrusion and laminating often precludes small fabricators from practicing this technology.

Another method which can be used to impart improved surface characteristics to various substrates is based on the use of solventless curable organic resins, or paints, such as shown by Bassemer et al U.S. Pat. No. 3,552,986, and Pickney U.S. Pat. No. 3,637,559, etc., which can be applied onto the surface of a substrate with a doctor blade, brush, roll-coater, etc. The cure of such organic resins can be effected by ultraviolet light, electron beam, heat, a chemical free radical initiator, etc., to produce a protective or decorative coating on the surface of the substrate. However, if the curable organic resin is used to treat a thermoplastic sheet and the resulting composite is thermoformed, the cured resin on the surface of the thermoplastic sheet generally ruptures or separates, as it does not have desirable biaxial elongation characteristics.

Prior to the present invention, solventless organic resin, such as a solution of an organic polymer in an organic monomer, for example, styrene or methylmethacrylate, applied on a substrate as a thin film for an in situ cure generally contained a cross-linking agent. It has long been established, for example, based on the work of E. Tromsdorff et al, Makromol Chem. 1, 169 (1948), that cure of methylmethacrylate-polymethylmethacrylate solution is feasible in a closed system. In an open system, particularly in the form of a thin film, it is not possible to obtain a cure due to excessive monomer evaporation. As taught by the above cited Pickney patent, there was used 3–20 percent by weight of a polymerizable methacrylate ester as a cross liking agent. As a result, stretchability of the cured film was substantially reduced.

Another technique which was used to increase cure speed of solventless resins applied as thin films on various substrates was high intensity radiation as shown by Osborn et al U.S. Pat. No. 3,650,669. Although increased speed was achieved by the use of a swirl-flow plasma arc, instead of low to medium pressure mercury lamp, the cured films resulting from the monomer solutions polymerized by the Osborne et al method were cross-linked and unsuitable for making themoformable composites.

Among the reasons why the aforementioned organic resins are unsuitable for making thermoformable composites are that either a cross-linking agent is used in the resin, or the polymer employed is highly unsaturated. Unless controlled, monomer evaporation occurs when the organic resin is cured as a thin film on the surface of the thermoplastic substrate. As taught by Pinkney U.S. Pat. No. 3,637,559, various copolymerizable materials can be used to minimize such monomer evaporation during film formation.

The present invention is based on the discovery that certain wax containing resins or blends, consisting essentially of solutions of either unsaturated polyesters or polymethylmethacrylate in styrene or methylmethacrylate respectively, can be painted onto the surface of certain aromatic thermoplastic structures, such as sheets of polystyrene, high impact modified polystyrene, polycarbonate, ABS, etc., and thereafter cured by UV radiation to a thermoplastic adherent film. The result is quite surprising in view of the tendency of excessive monomer evaporation, to occur prior to cure, when solutions of polymer in monomer are applied as thin coatings under atmospheric conditions in view of the above cited Tromsdorff effect.

Unexpectedly, the in situ formed thermoplastic films formed by the UV-cure of the organic resins used in the practice of the present invention are adherent and have excellent biaxial elongation characteristics. Since the cured film on the surface of the thermoplastic laminate stretches readily during thermoforming, stresses leading to film rupture are reduced or eliminated and the problem of film failure or film separation is overcome. As defined hereinafter, the term "biaxial elongation," within the definition of the present invention, signifies the ability of a thermoplastic structure to elongate up to 3,000%, preferably at least 400%, in a longitudinal and transverse manner. In calculating biaxial elongation, an area is marked off on the surface of the composite before thermoforming. The marked area is then measured after thermoforming. The ratio $100 \times (A_F - A_o)A_o$ is then defined as percent biaxial elongation, $A_o$ representing a marked area, such as a square, before thermoforming, and $A_F$ representing the resulting marked area after thermoforming.

There is provided by the present invention a substantially pollution-free method for making composites, involving the irradiation of a thermoplastic substrate treated with a UV-curable resin at a thickness of up to 5 mils using a source of UV irradiation having a wave length of between 1849A to 4000A and substantially free of radiation having a wave length greater than 7500A, and an intensity of at least about 0.033 watt per square inch, while maintaining the temperature of the substrate below about 60° C, which involves the improvement comprising utilizing as the UV-curable resin, a solventless polyester resin convertible to an adherent tack-free biaxially stretchable thermoplastic film to provide a thermoformable or vacuum formable composite consisting essentially of said thermoplastic substrate and said adherent tack-free biaxially stretchable thermoplastic film, where said solventless polyester resin contains as essential ingredients, (A) aliphatically unsaturated organic monomer, and
(B) an aliphatically unsaturated polyester soluble in (A) having a M.W. of from about 2,000 to 10,000 which consists essentially of chemically combined units resulting from the reaction of
 (i) a $C_{(2-20)}$ glycol free of aliphatic unsaturation, and
 (ii) aliphatically unsaturated dicarboxylic acid mixture consisting essentially of
  (a) $\alpha,\beta$-aliphatically unsaturated dicarboxylic acid and organic dicarboxylic acid selected from the class consisting of
  (b) organic dicarboxylic acid having $C_{(6-30)}$ divalent organic radicals between carbonyl radicals selected from the class consisting of aromatic radicals and cyclic radicals free of aromatic unsaturation,
  (c) linear saturated aliphatic carboxylic acid having 1-3 carbon atoms between carbonyl radicals,
  (d) linear saturated aliphatic dicarboxylic acid having at least 4 carbon atoms between carbonyl radicals,
(C) from 0.05 to 5% by weight based on the weight of (A), (B) and (C) of a UV sensitizer,
where the weight ratio of (A)/(B) has a value of 0.15 to 4, and based on the total moles of (a), (b), (c) and (d) units in (ii), (a) can be present at from 0.01 to 10 mole percent, (b) can be present at from 0 to 99.5 mole percent (c) can be present at from 0 to 70 mole percent and, (d) can be present at from 0 to 30 mole percent.

Another UV-curable organic resin or "acrylic resin" which can be used in the practice of the method of the invention contains as essential ingredients
 (D) methylmethacrylate,
 (E) polymethylmethacrylate, and
 (F) from .05% to 5% by weight of a UV sensitizer, based on the weight of (D), (E) and (F),
where (E) can have an average M.W. of from 1,000 to 50,000 and the weight ratio of D/E can have a value of from 0.5 to 1.5.

Included among the aliphatically unsaturated polyesters which can be employed in the above-described UV-curable polyester varnish are reaction products of organic polycarboxylic acids, such as phthalic, isophthalic, adipic, glutaric, malonic, succinic, suberic, azelaic, tetrachlorophthalic, tetrahydrophthalic, endomethylene tetrahydrophthalic, fumaric, maleic, citraconic, itaconic, reacted with glycols free of aliphatic unsaturation, such as 1,4-butane diol, 1,4-cyclohexane dimethanol, $C_{(2-8)}$ alkylene glycols, such as ethylene glycol, diethylene glycol, triethylene glycol, etc., 1,2-propylene glycol, 1,3-butylene glycol, 1,5-pentylene glycol, neopentyl glycol; isomers of dihydroxybenzene; bisphenols, such as diphenylol propane, halogenated bisphenols, where the total moles of the unsaturated organic carboxylic acid divided by the total moles of organic carboxylic acid in the aforesaid polyesters are as previously defined.

Small quantities of monofunctional and polyfunctional organic acids and glycols, such as palmitic acid pyromellitic acid, glycerine, cyclohexanol, etc., may also be incorporated in the polyester to obtain specific desirable properties. Although the molecular weight of the unsaturated polyester can be in the range of from about 2,000 to 10,000, it is preferred that the molecular weight be in the range of from about 2,000 to 6,000.

A preferred class of unsaturated polyesters which can be employed as part of UV-curable polyester resin is a reaction product of fumaric acid, isophthalic acid, and propylene glycol having aliphatic unsaturation within the above described definition.

The vinyl monomer utilized in combination with the above described polyester resin serves as a co-reactant and a solvent for the aforesaid unsaturated polyester in amounts to provide for a resin having a viscosity in the range of about 60 centipoises to 10,000 centipoises. When employing a roll coater to apply the polyester resin or the acrylic resin, the preferred viscosity if from 1,000 to 5,000 centipoises. Optimized cures can be achieved with low weight ratios of styrene to UV curable polyester, while still maintaining relatively high mole ratios of styrene to unsaturated units in the polyester because the polyester has a low degree of unsaturation. In other words, a polyester resin having a mole ratio of styrene to unsaturated units in the polyester, such as from 5 to 1 to as high as 17 to 1 can provide for polyester resin having satisfactory cure characteristics. In contrast, mole ratios as low as 2 or 3 of styrene to polyester unsaturation in conventional unsaturated polyester may not cure satisfactorily. Even at such low mole ratios of styrene to polyester unsaturation, conventional polyester resins may require a high weight percent of styrene in the resin mixture which may interfere with the cure of such polyester resin. Vinyl monomers or mixtures thereof which can be employed in combination with the aforesaid unsaturated polyester are, for example, styrene, methyl methacrylate, ethyl methacrylate, vinyl toluene, butyl acrylate, butyl methacrylate, acrylonitrile, vinyl acetate, diethyl fumarate, dipropyl fumarate, N-vinylpyrrolidone, etc.

Ultraviolet radiation photosensitizers effective in the UV curable resins used in the method of the present invention are, for example, ketones, such as benzophenone, acetophenone, benzil, benzyl methyl ketone; benzoins and substituted benzoins, such as benzoin methyl ether, $\alpha$-hydroxymethyl benzoin isopropyl ether; halogen containing compounds, such as $\alpha$-bromoacetophenone, p-bromoacetophenone, $\alpha$-chloromethylnaphthalene, sulfur compounds, such as aromatic disulfides, and other photosensitizers, such as azides, dyes, thioketones, or mixtures or synergistic mixtures thereof. Other compounds, at levels which do not interfere with the cure, may also be added to UV-resins. Such compounds are, for example, antioxidants, such as hydroquinone, tert-butyl hydroquinone, tert-butyl catechol, p-benzoquinone, 2,5-diphenylbenzoquinone, 2,6-di-tert-butyl-p-cresol, or ultraviolet-stabilizers, such as benzotriazoles, e.g., Tinuvin P, and Tinuvin 327 (manufactured by Geigy Corp.), hydroxy-benzophenones, such as 2,4-dihydroxybenzophenone, 2-hydroxy-4-methoxy-benzophenone, 4-dodecyl-2-hydroxy-benzophenone, substituted acrylonitriles, such as ethyl-2-cyano-3,3-diphenyl acrylate, ethylhexyl-2-cyano-3,3-diphenyl acrylate, etc.; various fillers, flatting agents, thioxtropic agents, dyes and pigments, such as barytes, blanc fixe, gypsum, calcium carbonate, quartz, diatomaceous silica, synthetic silica, clay, talc, asbestine, mica bentonite, aerogels, glass fibers, basic carbonate of white lead, antimony oxide, lithophone, titanium dioxide, ultramarine blue, aluminum powder, etc. In addition to the aforedescribed ingredients, UV-curable resins can contain up to 2%, preferably 0.05 to 1% of a wax. Suitable waxes include, for example, low melting paraffin waxes having a melting point of about 40° to 60° C.

In FIG. 1, there is shown a conveyor assembly for roller coating organic resin onto a thermoplastic sheet, curing the organic resin on the coated sheet with a UV lamp and means for shearing the coated sheet.

Figure 2:
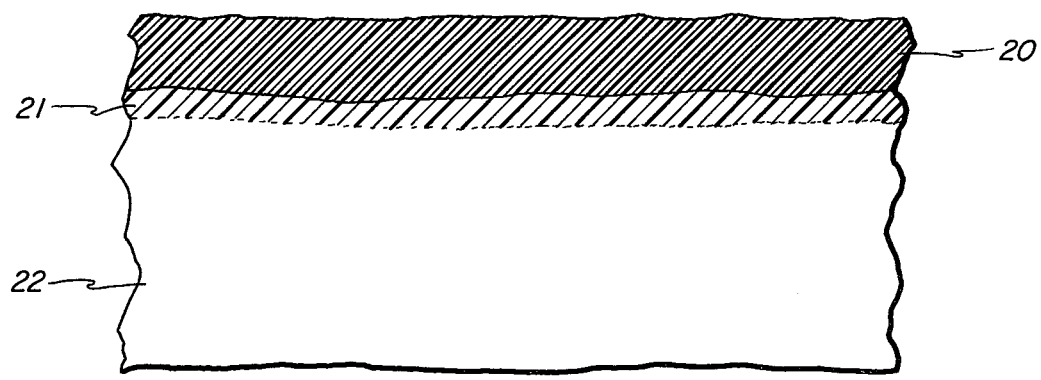

In FIG. 2 there is shown a composite formed by the process of this invention.

As shown in FIG. 1, a roll coater (at 10) can be employed to apply the UV-curable varnish to a continuously moving thermoplastic sheet. The sheet passes under a source of UV irradiation (at 11) having a heat filter. The heat filter can consist of two parallel quartz plates as covers for a fluid chamber. Passage of fluids such as air or water through the chamber serves to remove heat from the filter while permitting transmission of UV irradiation having a wave length between about 1849 A to 4000 A, substantially free of radiation about 7500 A. A shear is shown at 13, resin-coated thermoplastic sheets at 14.

A particular feature of the method of the present invention is the substantial absence of volatiles which normally are generated during the cure of UV-curable resins. "Pollution free" as used hereinafter signifies less than about 6% weight loss of resin volatiles during cure based on the total weight of resin. Pollution-free cures in from 0.5 to 5 minutes or less can be achieved by proper formulation of the resin. Another factor contributing to pollution free cures is the use of a particular UV-lamp system which optimizes resin cure while preventing the substrate surface from exceeding a temperature of about 60° C.

In the practice of the invention, thermoplastic sheets, such as polycarbonate, polystyrene, SBA-, polyphenylene oxide, etc., are treated with UV-curable resin which hereinafter can indicate either the polyester or acrylic resin. The coated sheets are then passed under a UV-lamp system to effect a cure of the resin in a substantially pollution-free manner. The resulting thermoformable composites may then be cut to size and placed in storage.

As previously described, the means for providing the above defined ultraviolet radiation consists of at least one ultraviolet lamp, a reflector, and one or more radiation filters. One or more ultraviolet lamps, such as from 1 to 200 discharge lamps, for example, xenon, metallic halide, metallic arc, such as mercury vapor discharge lamp, etc., having an operating pressure of from 1 to 10 atmospheres, etc., can be employed. The lamps can include envelopes capable of transmitting light of a wave length of from about 1,849 A to 4,000 A, and preferably 2,400 A to 4,000 A. The lamp envelope can consist of quartz, such as Spectrocil, etc. Typical lamps which can be employed for providing ultraviolet radiation are, for example, medium pressure mercury arcs, such as the G.E. H3T7 arc, etc.

In operating the lamp to achieve a desirable level of flux intensity required for effecting cures of the solventless resin in a pollution free manner, the lamps can be ballasted to provide a higher watts per inch input than that normally rated by the manufacturer. For example, the GE H3T7 lamp normally operated at 130 watts per inch, can be operated at up to 300 watts per inch input over a satisfactory operating life.

In addition to the above-described lamp means for generating ultraviolet radiation employed in the practice of the invention, the means for providing such ultraviolet radiation in the apparatus used therein also includes radiation filering means, such as quartz windows, employed in combination with the lamp and reflector to provide means for ultraviolet radiation having a wave length of from between about 1,849 A to 4,000 A, while effecting the removal of radiation greater than 7,500 A. The aforementioned windows can be made of any suitable material capable of transmitting ultraviolet at a wave length of between 1,849 A to 4,000 A, such as quartz, Pyrex, Vycor, plastic sheets such as poly(methylmethacrylate), etc. Typically, the filters can be approximately the same size as the lamps or larger.

A thermal control means optionally can include support means for the radiation filters, which when separated to a satisfactory degree, such as 1 inch or more, can provide a channel, to allow for the passage of air or water, to remove heat from the radiation filters. Removal of heat also can be achieved by the employment of a cooling coil in instances where filter support means are employed.

In order that those skilled in the art will be better able to practice the invention, the following examples are given by way of illustration and not by way of limitation. All parts are by weight.

EXAMPLE 1

A UV-curable resin based on an unsaturated polyester was prepared as follows: Polyester was synthesized by reacting isophathalic acid (0.095 mole), fumaric acid (0.05 mole), and propylene glycol (1.05 mole) in the presence of toluene at a temperature of 180° to 200° C. After the resulting unsaturated polyester resin reached an acid number of 34, toluene was stirpped from the mixture utilizing a stream of nitrogen. The resin was stabilized with 0.03% by weight of hydroquinone. To the resulting polyester resin there was added at 100° C, styrene and paraffin wax to produce a styrene-polyester blend, containing 30 parts by total weight of styrene and 0.2 part by weight of wax. Based on the total moles of organic carboxylic acid units the polyester contained 5 mole percent of fumarate unsaturation.

The above polyester-styrene solution was sensitized with 1% of benzoin methyl ether. The resulting UV-curable resin was spread on a ⅛ inch thick polystrene sheet with a doctor blade to a thickness of 10 mil. The treated polystyrene sheet was cured in air at room temperature by exposure to a system containing 5 H3T7 G.E. medium pressure arc lamps at a distance of about 8 inches. The H3T7 lamps had been ballasted to permit operation at about 960 watts input. The system was operated using an air-cooled thermo-control means as shown in the drawing. The flux density at the substrate was at least 0.033 watt per square inch while the surface temperature did not exceed 60° C. Cure of the resin to a tack-free coating having a hardness of about 2B was achieved in 3 minutes.

The treated polystyrene sheet was vacuum-formed by heating the sheet at 150° C for 10 minutes and while still hot, drawing it into a Buchner funnel of 2.5 inch diameter and 1 inch depth. The sheet deformed to fit the funnel perfectly. Upon examining the thermoformed sheet, it was found that the surface coating derived from the cure of the solventless resin had stretched up to 400%. The percent stretch was calculated by measuring a marked area on the surface of the cured composite prior to and after thermoforming. There was no evidence of film-rupture or separation. Compared to the uncoated polystyrene sheet, the laminate was found to provide substantially improved resistance to stress-cracking by a cooking oil mixture. During the cure of the resin, less than 5% of volatiles were lost from the treated surface of the polystyrene, as calculated from the weight loss of the treated sheet during cure.

The above procedure was repeated, except that 5% of a commercial pigment, "Chartreuse X-110" of the Radiant Color Company of Richmond, Calif. was incorporated into the resin blend. The solventless resin was cured on the surface of the polystyrene to produce a thermoformed article with an attractive, smooth, adherent chartreuse finish.

EXAMPLE 2

Clear, transparent composites of polycarbonate sheets were produced having bonded to one surface a cured 5 mil film resulting from the cure of the UV-curable resin of Example 1. The sheets are made by extrusion to a thickness of about 125 mil from polycarbonate resin synthesized in accordance with U.S. Pat. No. 3,028,365. As shown in FIG. 1, the extruded polycarbonate sheet is passed under a roller coater where the UV-curable resin of Example 1 is applied to a thickness of about 5 mil and the treated sheet is then passed under a UV-lamp system at a distance of about 8 inches from the lamps. After a total exposure time of 120 seconds, the tack-free composite is vacuum formed after heating it to 200° C for 10 minutes. The maximum elongation on the vacuum-formed piece which shows a smooth, non-ruptured film is 400 percent.

EXAMPLE 3

A series of unsaturated polyester resins were prepared containing various amounts of tetrahydrophthalic acid, isophthalic acid, adipic acid, fumaric acid, neopentyl glycol and propylene glycol. The polyesters contained the following ingredients where the units are in moles:

|  | A | B | C | D |
|---|---|---|---|---|
| Fumaric Acid | 0.05 | 0.10 | 0.25 | 0.50 |
| Isophthalic Acid | 0.85 | 0.90 | 0.75 | — |
| Adipic Acid | 0.10 | — | — | — |
| Tetrahydrophthalic Acid | — | — | — | .50 |
| 1,2-Propylene Glycol | 1.10 | 1.10 | 1.10 | .70 |
| Neopentyl Glycol | — | — | — | .40 |
| Acid Number | 35 | 36 | 31 | 26 |

UV-curable resins were prepared from the above described unsaturated polyesters employing 30% styrene, 1% of benzoin methyl ether and 0.2% of wax. Polystyrene sheets were coated with these blends at thicknesses of up to 10 mil using a doctor blade. The various treated sheets were cured by the same UV lamp system as employed in Example 1. During the cure, less than about 3% by weight of volatiles were lost from each of the coated polystyrene panels, while a temperature at less than 60° C was maintained. The composites, hereinafter referred to as Laminate A, Laminate B, Laminate C, and Laminate D, respectively, based on the resin employed were thermoformed in accordance with the procedure of Example 1. Squares had been drawn on the panel surfaces prior to thermoforming to determine the degree of stretch. The following results were obtained:

| Laminate | Condition of Film |
|---|---|
| A | Smooth, tack-free |
| B | Smooth, tack-free, cracked at edges at 500 percent elongation |
| C | Ruptured film at less than 200 percent elongation |
| D | Ruptured film at less than 100 percent elongation |

The above results show that the ingredients and proportions by weight used in making the unsaturated polyesters employed in the method of the present invention are quite critical. Polyesters C and D produced unsatisfactory composites since the degree of aliphatic unsaturation exceeded 10 mole percent.

EXAMPLE 4

A thermoformable composite was prepared of 125 mil polystyrene panel and 6 mil UV-resin cured in accordance with the procedure of Example 1.

The UV-resin consisted of 50 parts of commercial poly(methylmethacrylate) resin having a number average molecular weight of 27,000, 50 parts of a mixture of 20% butyl acrylate and 80% methyl methacrylate, 2 parts of Cyasorb UV-531, a commercial UV stabilizer manufactured by American Cyanamid Company and 2 parts by weight of a UV sensitizer.

The above described composite was irradiated with UV for several hours. An uncoated polystyrene panel also was exposed to UV irradiation in a similar manner. An examination of the uncoated polystyrene panel showed severe yellowing, whereas the thermoformable composite did not show any effects of UV degradation.

EXAMPLE 5

Polyesters A, B, C and D, of Example 3, were blended with styrene to produce a series of blends having molar ratios of styrene to fumarate varying from 7:1 to 17:1. To the respective blends, there were added about 1% by weight of benzoin methyl ether and about 0.2% by weight of paraffin wax. The blends were then cured under identical conditions as described in Example 6. The following results were obtained ("% Fumarate" shows the mole percent of unsaturation in the polyester. "Styrene-Fumarate" shows the ratio of moles of styrene to moles of fumarate in the mixture):

| Polyester | % Fumarate | Styrene-Fumarate | Cure Time |
|---|---|---|---|
| A | 5 | 8:1 | 3 min. |
| B | 10 | 8:1 | 2 min. |
|  |  | 17:1 | 5 min. |
| C | 25 | 8:1 | No cure in 10 min. |
|  |  | 10:1 | No cure in 20 min. |
| D | 50 | 8:1 | No cure in 10 min. |
|  |  | 10:1 | No cure in 20 min. |

The above results show that polyester formulations C and D having a mole percent unsaturation (% Fumarate) exceeding UV polyester resin A and B, do not cure after an extended period of time. However, resin formulations A and B with a low (% Fumarate) unsaturation cure in 5 minutes or less even though styrene to fumarate rations as high as 17 to 1 are used.

EXAMPLE 6

Sign grade polycarbonate sheet is coated with a UV curable resin prepared from 50 parts by weight of a polymethylmethacrylate having a number average molecular weight of 25,000, 50 parts by weight of methyl methacrylate, 1 part by weight of benzoin methyl ether, 1 part of a UV stabilizer 2-hydroxy-4-octaoxybenzophenone and 0.2 parts by weight of paraffin wax. On contact with the polycarbonate sheet, the polymethylmethacrylate resin starts to swell the surface of the polycarbonate,. The treated polycarbonate sheet is then exposed to U.V. light over a 5 minute period. During the curing period, the polycarbonate sheet in contact with the remaining uncured polymethylmethacrylate resin continues to dissolve in the coating resin until curing is complete.

A polymethylmethacrylate-polycarbonate composite is shown by FIG. 2, having an intermediate polycarbonate boundary layer, where 20 is the polycarbonate substrate, 21 is an intermediate solution layer of the polycarbonate in the polymethylmethacrylate resin and 22 is the cured polymethylmethacrylate film. This is shown by taking a photograph of a cut section on a Zeiss Ultraphoto Metallograph. Based on a 1-5 mil polymethylmethacrylate protective film, the composite made in accordance with the method of the invention can have a 0.10 to 1.0 mil of an intermediate boundary layer.

A Reverse Gardner Impact test ASTM D2799-69 of 160 in.-lbs is performed on 100 ml polycarbonate test slabs having a 2 mil polymethylmethacrylate coating. One test slab is made in accordance with the practice of the method of the invention by forming the polymethylmethacrylate in situ. Another test slab is made by bonding a preformed 2 mil film onto a 100 mil polycarbonate substrate in accordance with the procedure of Freudenburgh, U.S. Pat. No. 3,654,069. The polymethylmethacrylate film on the composite made in accordance with the method of the invention is found to be substantially free of cracks, while the polymethylmethacrylate film on the composite made by the prior art shows a significant degree of cracking. Those skilled in the art know that the above results establish that the in situ formed film on the composite made in accordance with the practice of the invention exhibits superior adhesion as compared to the preformed film of the prior art.

Although the above examples are directed to only a few of the very many variables which can be used in the practice of the method of the present invention, it should be understood that the present invention is broadly directed to a much broader method and thermoformable composites as set forth in the description preceding these examples.

What we claim as new and desire to secure by Letters Patent of the United States is:

1. A substantially pollution-free method for making thermoformable or vacuum formable biaxially stretchable composites exhibiting a biaxial elongation in excess of 200% without failure said method comprising
   (1) providing as a substrate, a biaxially stretchable thermoplastic sheet exhibiting biaxially elongation in excess of 200%
   (2) coating said biaxially stretchable thermoplastic sheet with a resinous composition to a thickness of up to 5 mils and
   (3) effecting the cure of the resinous composition with a source of UV irradiation having a wave length of between 1849A to 4000A, where the resinous composition is a member selected from the class consisting of a
   (A) solventless polyester resin containing as essential ingredients
      (a) aliphatic unsaturated organic monomer,
      (b) an aliphatically unsaturated polyester soluble in (a), and having a MW of from about 2000 to 10,000 which is the reaction product of a $C_{(2-20)}$ glycol free of aliphatic unsaturation and an aliphatically unsaturated dicarboxylic acid mixture consisting essentially of
         (i) $\alpha,\beta$-aliphatically unsaturated dicarboxylic acid and an organic dicarboxylic acid selected from the class consisting of
         (ii) organic dicarboxylic acid having $C_{(5-30)}$ divalent organic radicals between carbonyl radicals selected from aromatic radicals and cyclic radicals free of aromatic saturation,
         (iii) linear saturated aliphatic dicarboxylic acid having 1-3 carbon atoms between carbonyl radicals,
         (iv) linear saturated aliphatic dicarboxylic acid having at least 4 carbon atoms between carbonyl radicals and
      (c) from 0.5% to 5% by weight based on the weight of (a), (b) and (c) of a UV sensitizer, where the weight ratio of (a)/(b) has a value of 0.15 to 4 and based on the total moles of (i), (ii), (iii) and (iv) in the aliphatically unsaturated polyester, (i) is present at from 0.01 to 10 mole percent, (ii) is present at from 0 to 99 mole percent, (iii) is present at from 0 to 70 mole percent and (iv) is present at from 0 to 30 mole percent, and
   (B) a curable acrylic resin which contains as essential ingredients
      (d) methylmethacrylate,
      (e) polymethylmethacrylate and
      (f) from 0.05 to 5% by weight of (d), (d) and (f) of a UV sensitizer,
   where (e) has an average MW of from 1000 to 50,000 and the weight ratio of (d)/(e) is from 0.5 to 1.5.

2. A method in accordance with claim 1, where the solventless organic resin is a mixture of styrene and an unsaturated polyester.

3. A method in accordance with claim 1, where the UV curable resin contains as essential ingredients
   (D) methyl methacrylate,
   (E) polymethylmethacrylate, and
   (F) from 0.05 to 5% by weight of (D), (E) and (F) of a UV sensitizer,
where (E) is an average M.W. of from 1000 to 50,000 and the weight ratio of D/E is a value of from 0.4 to 1.5.

4. A method in accordance with claim 1, where the unsaturated polyester contains chemically combined fumaric acid units and propylene glycol units.

5. A method in accordance with claim 1, where the substrate is a high impact modified polystyrene substrate.

6. A method in accordance with claim 1, where the substrate is a polycarbonate.

7. A method in accordance with claim 1, where the substrate contains a poly(phenyleneoxide) blend.

8. A thermoformable or vacuum formable biaxially stretchable composite exhibiting a biaxial elongation in excess of 200% without failure comprising a biaxially stretchable sheet adherently coated with a cured resionous composition, selected from the class consisting of
(A) a polyester resin resulting from the reaction of
  (a) an aliphatically unsaturated organic monomer and
  (b) an aliphatically unsaturated polyester soluble in said aliphatically unsaturated organic monomer and having a MW of from about 2000 to 10,000 which is the reaction product of a $C_{(2-20)}$ glycol free of aliphatic unsaturation and an aliphatically unsaturated dicarboxylic acid mixture consisting essentially of
    (i) $\alpha,\beta$-aliphatically unsaturated dicarboxylic acid and an organic dicarboxylic selected from the class consisting of
    (ii) organic dicarboxylic acid having $C_{(5-30)}$ divalent organic radicals between carbonyl radicals selected from aromatic radicals and cyclic radicals free of aromatic saturation,
    (iii) linear saturated aliphatic dicarboxylic acid having 1–3 carbon atoms between carbonyl radicals,
    (iv) linear saturated aliphatic dicarboxylic acid having at least 4 carbon atoms between carbonyl radicals and
  (c) from 0.5% to 5% by weight based on the weight of (a), (b) and (c) of a UV sensitizer, where the weight ratio of (a)/(b) has a value of 0.15 to 4, and based on the total moles of (i), (ii), (iii) and (iv) in the aliphatically unsaturated polyester, (i) is present at from 0.01 to 10 mole percent, (ii) is present at from 0 to 99 mole percent, (iii) is present at from 0 to 70 mole percent and (iv) is present at from 0 to 30 mole percent, and
(B) curable acrylic resin which contains as essential ingredients
  (d) methylmethacrylate,
  (e) polymethylmethacrylate and
  (f) from .05 to 5% by weight of (d), (e) and (f) of a UV sensitizer, where (e) has an average MW of from 1000 to 50,000 and the weight ratio of (d)/(e) is from 0.5 to 1.5.

9. A composite in accordance with claim 8, where the substrate consists essentially of a high-impact modified polystyrene and the adherent film is the reaction product of styrene and unsaturated polyester.

10. A composite in accordance with claim 8, of a polycarbonate substrate and a cured polymethylmethacrylate film.

11. A composite in accordance with claim 8, of a poly)phenyleneoxide) substrate and a cured polymethylmethacrylate film.

12. A composite in accordance with claim 8, where the cured film is the reaction product of styrene and unsaturated polyester.

* * * * *